(12) United States Patent
Moon

(10) Patent No.: US 6,205,126 B1
(45) Date of Patent: Mar. 20, 2001

(54) METHOD AND APPARATUS FOR AUTOMATICALLY DETERMINING AN ISP LOCAL ACCESS NUMBER BASED ON DEVICE LOCATION

(75) Inventor: Billy Gayle Moon, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/941,517

(22) Filed: Sep. 30, 1997

(51) Int. Cl.$^7$ ....................................................... H04Q 7/00
(52) U.S. Cl. .......................... 370/329; 370/259; 370/342; 455/435; 709/229
(58) Field of Search ..................... 455/435, 403; 370/389, 392, 393, 401, 338, 329, 259, 342; 709/200, 227, 229; 342/389

(56) References Cited

U.S. PATENT DOCUMENTS

| | | | |
|---|---|---|---|
| 5,301,359 | 4/1994 | Van Den Heuvel et al. ........ | 455/524 |
| 5,475,735 | * 12/1995 | Williams et al. .................... | 455/403 |
| 5,581,802 | 12/1996 | Erickson et al. .................... | 455/510 |
| 5,635,940 | * 6/1997 | Hickman et al. .................... | 342/389 |
| 5,742,598 | * 4/1998 | Dunn et al. .......................... | 370/393 |
| 5,778,315 | * 7/1998 | Proietti ................................ | 455/419 |
| 5,862,339 | * 1/1999 | Bonnaure et al. .................... | 709/227 |
| 5,933,490 | * 8/1999 | White et al. ......................... | 379/221 |
| 5,958,016 | * 9/1999 | Chang et al. ......................... | 709/229 |

OTHER PUBLICATIONS

"Microsoft Announces Internet Referral Server to Facilitate Selection of Internet Service Provider for Users of Windows, Microsoft Internet Explorer", Microsoft Press Release, Jul. 30, 1996.

* cited by examiner

Primary Examiner—Ajit Patel
Assistant Examiner—John Pezzlo
(74) Attorney, Agent, or Firm—Burns, Doane, Swecker & Mathis, L.L.P.

(57) ABSTRACT

A local access number is automatically determined for facilitating communication between a portable communication device and one or more local service providers. A new location of the portable communication device is detected, and a determination is made whether a local access number is stored in the portable communication device for the new location. If the local access number is not stored, the new location of the portable communication device is reported to a location server in the local service provider serving the new location. The location server provides an appropriate local access number for the new location, and this local access number is stored in the portable communication device.

12 Claims, 2 Drawing Sheets

METHOD AND APPARATUS FOR AUTOMATICALLY DETERMINING AN ISP LOCAL ACCESS NUMBER BASED ON DEVICE LOCATION

FIELD OF THE INVENTION

The present invention relates generally to a method and apparatus for facilitating communication. More particularly, the present invention relates to a method and apparatus for automatically determining an appropriate local access number for facilitating communication from a portable communication device.

BACKGROUND OF THE INVENTION

Portable communication devices have become increasingly popular, particular for traveling business persons. A portable communication device permits a user to perform multiple tasks on a computer, such as word processing, at any location. A portable communication device also permits a user to communicate, via a modem, with another device or with the Internet, from any location.

A portable communication device communicates with the Internet by connecting to an Internet Service Provider (ISP) serving a local area in which the portable communication device is located. A typical local area may comprise one or more cities. Many ISPs have several different local access numbers for different cities located within their local areas to facilitate cheaper access costs within those cities. By dialing the appropriate local access number for the local area in which the portable communication device is located, the user can avoid a long distance charge when connecting to the Internet. A problem with this procedure is that the user may not know the appropriate local access number for the local area from which he or she is attempting to communicate. Thus, the user has to somehow keep track of various local access numbers, for example by manually entering them into a database in the portable communication device. As can be seen from the attached Appendix of the IBM Global Network Phone List and the IBM Global Network Internet Registration Phone List, the list of local access numbers can be quite extensive. Thus, it would be difficult for the user to memorize all the necessary local access numbers or to manually enter them into a database. Also, entering the local access numbers into a database consumes valuable memory in the portable communication device. These problems become more complicated as the local access numbers change, more are created, or the user needs to communicate from more local areas, since this requires updating of the list of local access numbers.

Another problem with the user keeping track of the local access numbers is that the user has to know the local area he or she is in at a given time and/or the ISP that serves that local area, or if there are various ISP's serving the local area, the ISP that will be the cheapest to connect to. Then, the user must select an appropriate local access number, accordingly. The only alternative is for the user to use a more expensive 800 number or place a long distance call to single local number.

This problem is complicated by the fact that the selection of an appropriate local access number may depend on other factors besides cost, e.g., the quality of the transmission link provided by various ISP's. Worse yet, many tasks of the portable computer are automatically carried out without the user's active participation, and thus it may be impossible for the user to select an appropriate local access number before a connection is made. In this case, the portable communication device may use a local access number which is not the most desirable.

One approach to solving this problem has been developed by Microsoft Corp. As described in a Jul. 30, 1996 Microsoft Press Release entitled "Microsoft Announces Internet Referral Server to Facilitate Selection of Internet Service Provider for Users of Windows, Microsoft Internet Explorer", the proposed solution presents a choice of ISPs with local telephone access numbers, along with their subscription and pricing information, based on the user's country, area code, and telephone exchange, and the user selects an ISP. While this approach makes it easier for the user to determine local access numbers of an ISP serving the local area from which he or she desires to communicate, the user is still required to select an appropriate local access number.

Thus, there is a need for a method and system which enable a user to communicate from a portable communication device from any location in the most effective manner without requiring that the user keep track of and select an appropriate local access number.

SUMMARY OF THE INVENTION

These and other objectives are met, according to the present invention, by a method, apparatus, and system for automatically determining a local access number for facilitating communication between a portable communication device and one or more local service providers.

According to an exemplary embodiment of the present invention, a new location of the portable communication device is detected, and a determination is made whether a local access number is stored in the portable communication device for the new location of the device. If the local access number is not stored, the new location of the portable communication device is reported to a location server in the local service provider serving the new location. The location server provides an appropriate local access number for the new location, and the local access number is stored in the portable communication device.

BRIEF DESCRIPTION OF THE DRAWINGS

A more complete understanding of the present invention can be obtained upon reading the following Detailed Description of the Preferred Embodiments, in conjunction with the accompanying drawings, in which like reference numbers are used to designate like elements, and in which.

DETAILED DESCRIPTION OF THE PREFERRED EMBODIMENTS

Figure 1:
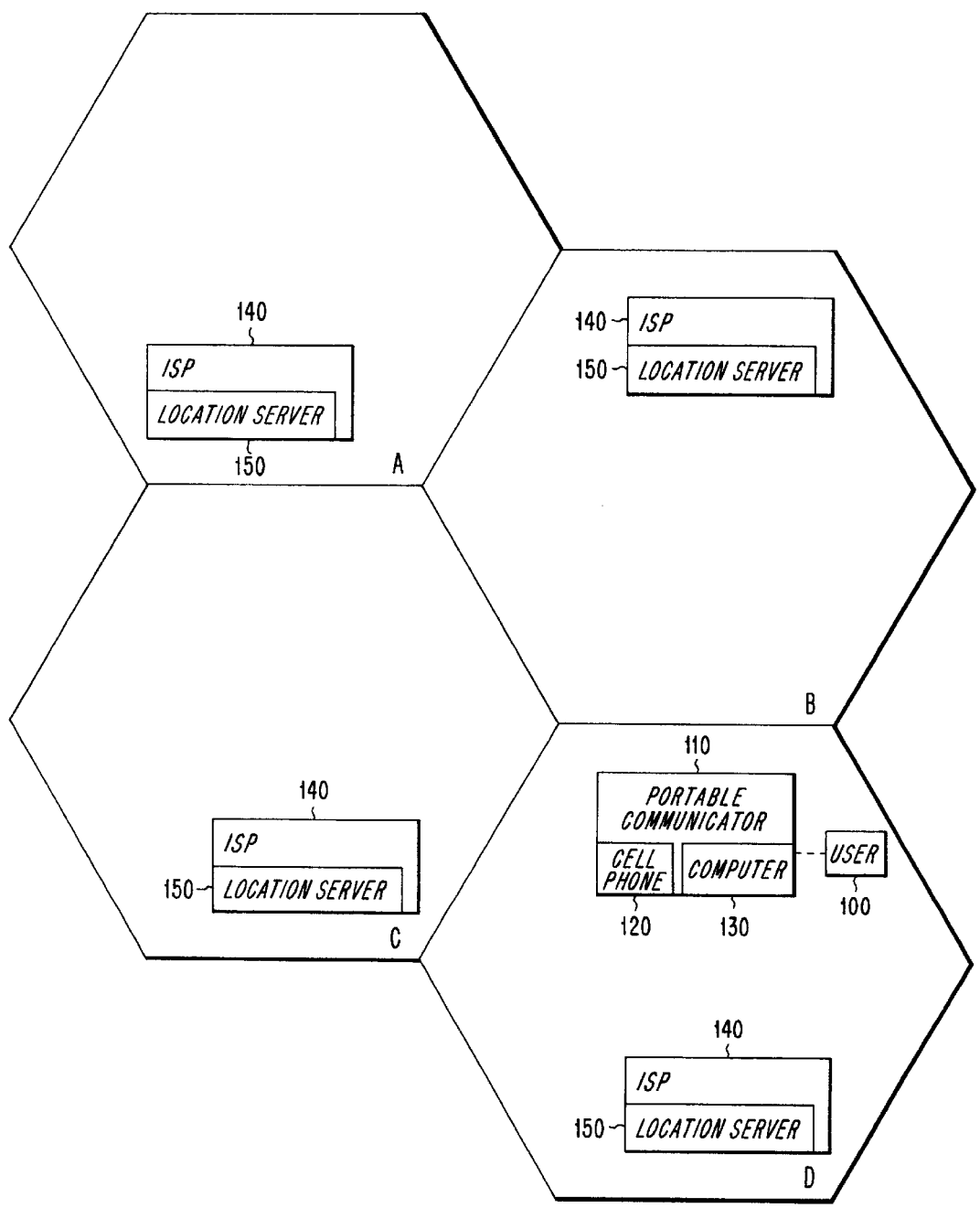
FIG. 1 illustrates an exemplary system for automatically determining a local access number according to an exemplary embodiment of the present invention.

FIG. 1 illustrates an exemplary system for automatically determining a local access number according to the present invention. Referring to FIG. 1, a Portable Communicator 110 moves from location to location and from local area to local area. In FIG. 1, there are four local areas designated as A, B, C, and D, each of which contains numerous locations. The four local areas in FIG. 1 are shown by way of example, only, and the invention is applicable to any number and configuration of local areas. Each local area is served by a local service provider, for example an Internet Service Provider (ISP) 140. Each ISP comprises a Location Server 150 that keeps track of local access numbers assigned to various locations within the local area served by the ISP.

The Portable Communicator 110 contains software and hardware that enable a User 100 to communicate with the Internet from any location, via an ISP 140 which serves that location. The Portable Communicator 110 includes a transceiver, such as a Cellular Telephone 120, and a Computer 130. The Computer 130 can be implemented with, for example, a programmable microprocessor. The Portable Communicator 110 can periodically utilize data connections to the Internet to facilitate messaging and information services. Messaging provides unified E-Mail, Fax-Mail and Voice Mail. Information services can be provided by the World Wide Web, among other Internet resources.

The Portable Communicator 110 automatically retrieves an appropriate local access number for the location from which the User 100 desires to connect the Internet, either by retrieving the local access number from an internal local cache within the Portable Communicator 110 or from the Location Server 150. For example, the last 1000 or so local access numbers of a given ISP can be stored in the internal local cache in the Portable Communicator 110, each local access number corresponding to a location within the local area served by the ISP.

Figure 2:
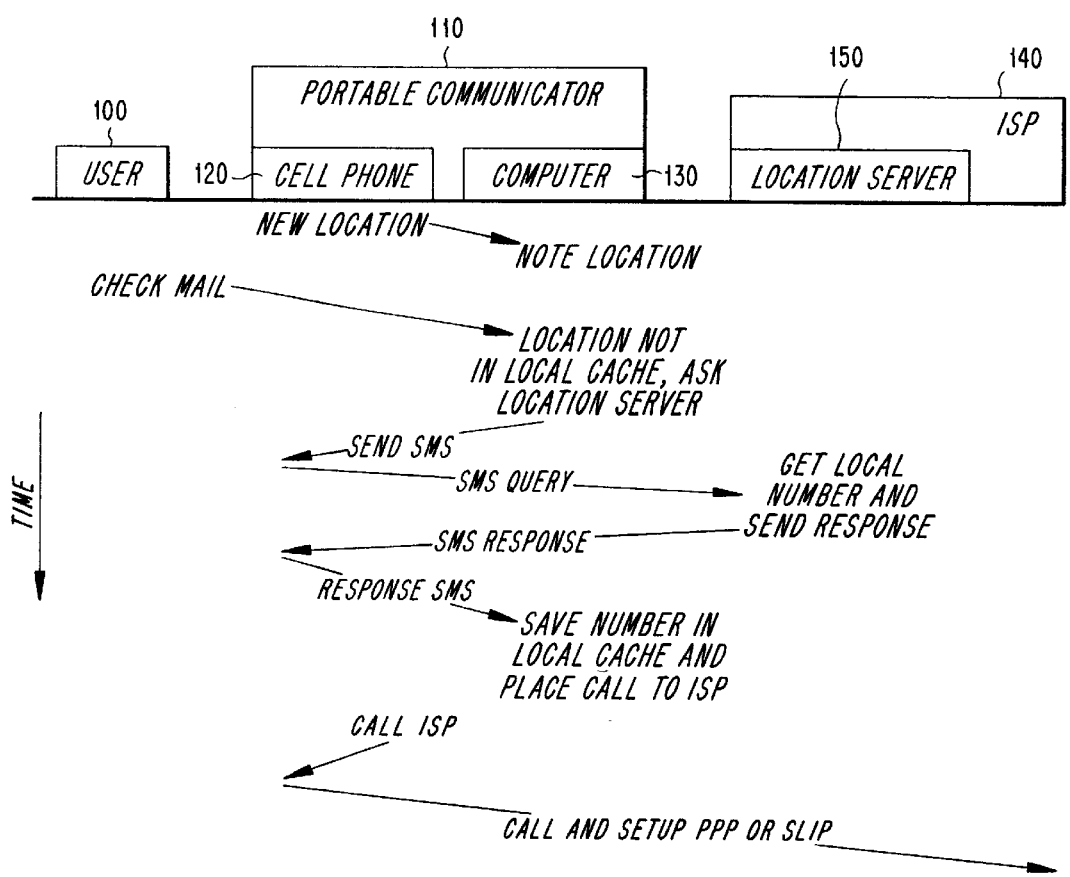
FIG. 2 illustrates an exemplary method for automatically determining a local access number according to the present invention.

FIG. 2 illustrates an exemplary method for automatically determining a local access number according to the present invention. The method begins with the Portable Communicator 110 entering a new location and the Cellular Telephone 120 detecting the new location and informing the Computer 130 of the new location. The Cellular Telephone 120 can detect and determine the new location by, for example, exchanging messages with a base station serving the new location, according to known techniques.

Next, if the User 100 attempts to access the Internet to, for example, check electronic mail, the Computer 130 determines whether a local access number for the new location of the Portable Communicator 110 is stored in the local cache. If a local access number for the new location is stored in the local cache at the time the 'check mail' request is made by the user, then that local access number is dialed directly, and an attempt is made to contact the ISP 140.

If no local access number is stored in the local cache for the new location, and the User 100 desires to make an Internet connection, then a Short Message Service (SMS) message is sent to ask the Location Server 150 for the local access number before the Internet connection is attempted. The Computer 130 sends an SMS Message to the Cellular Telephone 110, and the Cellular Telephone sends an SMS Query to the Location Server 150. The Location Server 150 determines an appropriate local access number for the new location and sends an SMS Response containing the local access number to the Cellular Telephone 110. This determination can be made by referring to a table of defined local access numbers for various locations stored within the Location Server 150. This table can be updated as needed, when local access numbers are added or change.

The SMS Response from the Location Server 150 can also contain call setup data, e.g., baud rate, modem type, etc. The Location Server 150 can keep track of all the Portable Communicators and other devices that have received a message in each location served by the corresponding ISP 140 such that when call setup data is changed for a particular location, updates can be sent to each device at that location.

If no SMS Response is received from the Location Server 150 by the Cellular Telephone 110 within a reasonable time, e.g., 30 seconds, then the call is placed to a "default" local access number. This amount of time can be set to any amount, as desired. The Cellular Telephone 110 then sends an SMS Response to the Computer 130 containing the local access number, and the Computer stores the local access number in the local cache. If the local cache is full, then the oldest entry in the cache can be deleted and replaced with the new local access number. The Computer 130 then instructs the Cellular Telephone 110 to place a call to the ISP, and the Cellular Telephone initiates call setup.

According to the present invention, an appropriate local access number can be automatically determined for facilitating communication between a portable communication device and a local service provider. This permits a user to communicate from any location without having to keep track of local access numbers for various locations.

Although the embodiments described above is directed to an Internet environment, the invention is not limited to Internet applications. Furthermore, although the embodiment described above is directed to a portable communication device in a cellular newwork, the same principle can be applied to other wired or wireless telecommunication systems.

While the foregoing description includes numerous details and specificities, it is to be understood that these are for purposes of explanation only. Many modifications will be readily apparent to those of ordinary skill in the art which are clearly within the and scope of the invention, as defined by the following claims and their legal equivalents.

What is claimed is:

1. A method for automatically determining a local access number for facilitating communication from a portable communication device to one or more location service providers, comprising the steps of:
   detecting when the portable communication device enters a new location;
   determining if a local access number is stored in the portable communication device for the new location; and
   if the local access number for the new location is not stored, reporting the new location of the portable communication device to a location server in a local service provider which serves the new location, wherein the location server provides an appropriate local access number for the new location, and this local access number is stored in the portable communication device.

2. The method of claim 1, wherein the portable communication device stores a plurality of local access numbers for a plurality of locations.

3. The method of claim 1, wherein the local service providers are Internet service providers.

4. The method of claim 1, wherein if the portable communication device does not receive the local access number for the new location within a predetermined amount of time, a default local access number is used as the local access number.

5. A portable communication device for automatically determining a local access number for facilitating communication from a portable communication device to one or more location service providers, comprising:
   a cellular transceiver for detecting when the portable communication device enters a new location;
   a memory for storing local access numbers; and
   a computer for determining if a local access number is stored in the memory for the new location, wherein if the local access number for the new location is not stored, the cellular transceiver reports the new location of the portable communication device to a location server in the local service provider serving the new location, the location server provides an appropriate local access number for the new location, and this local access number is stored in the memory.

6. The portable communication device of claim 5, wherein the memory stores a plurality of local access numbers for a plurality of locations.

7. The portable communication device of claim 5, wherein the local service providers are Internet service providers.

8. The portable communication device of claim 5, wherein if the local access number for the new location is not received from the location server within a predetermined amount of time, a default local access number is used as the local access number.

9. A system for automatically determining a local access number for facilitating communication between a user and one or more local service providers, comprising:

one or more location servers, each location server containing a plurality of local access numbers for a plurality of locations served by a corresponding local service provider; and a portable communication device storing various local access numbers, wherein the portable communication device detects when it enters a new location and determines if a local access number is stored for the new location, and if the local access number is not stored for the new location, the portable communication device reports the new location to a location server in the local service provider serving the new location, the location server provides an appropriate local access number for the new location, and this local access number is stored in the portable communication device.

10. The system of claim 9, wherein the portable communication device stores a plurality of local access numbers for a plurality of locations.

11. The system of claim 9, wherein the local service providers are Internet service providers.

12. The system of claim 9, wherein if the portable communication device does not receive the local access number for the new location within a predetermined amount of time, a default local access number is used as the local access number.

* * * * *